Dec. 27, 1949   R. R. FIKE ET AL   2,492,140
FLUID FLOW CONTROL DEVICE
Filed Jan. 22, 1944
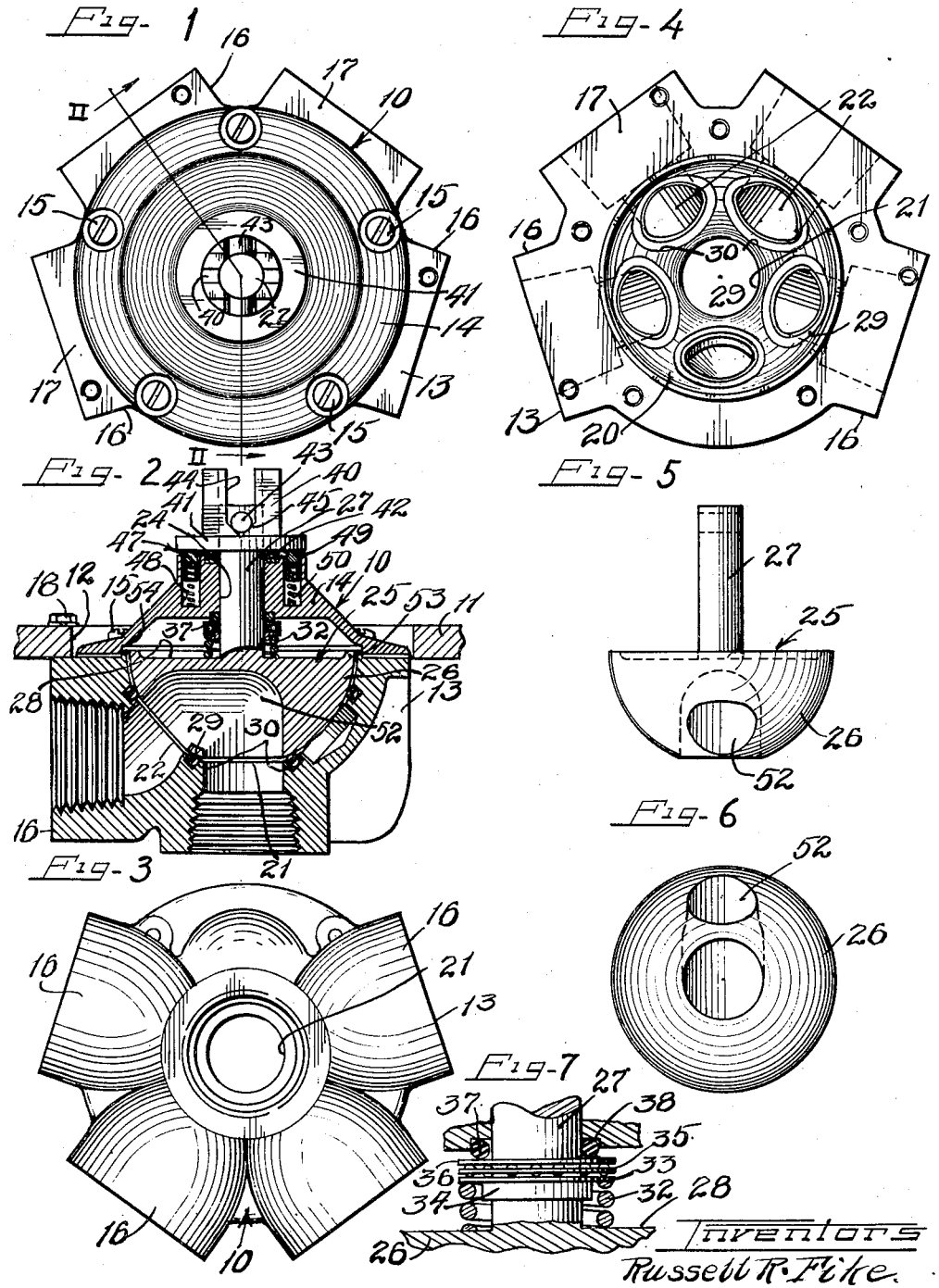
Inventors
Russell R. Fike
Nathan W. Oakes Patented Dec. 27, 1949

2,492,140

UNITED STATES PATENT OFFICE 2,492,140

FLUID FLOW CONTROL DEVICE

Russell R. Fike, Cleveland, and Nathan W. Oakes, Shaker Heights, Ohio, assignors to Thompson Products, Inc., a corporation of Ohio Application January 22, 1944, Serial No. 519,270

1 Claim. (Cl. 251—97)

The present invention relates to a fluid flow control device such, for example, as a selector cock or control valve for manipulating the flow of fluid in a conduit or the like, being particularly advantageously employed for controlling the flow of fuel from the several fuel tanks of an airplane to the airplane engine.

More particularly, the present invention is concerned with an improved form of selector cock which embodies a casing having an internal chamber the walls of which accommodate tilting movement of a plug having a surface of revolution cooperating with the chamber walls. The chamber may advantageously be of substantially hemispherical shape and have disposed therein a rotatable plug for controlling an inlet and an outlet connecting with said chamber embodying a substantially hemispherically shaped body part and a stem portion which may or may not be formed integrally therewith.

The device of the present invention is adapted to be mounted directly upon an apertured support and the inlet connections emanating radially from the casing are provided with planar surfaces into which the mounting means, such, for example, as bolts may be threaded to secure the unit in place. The cover member for the casing serves as a locater for the unit with respect to the aperture in the wall upon which it is to be mounted.

By reason of the fact that the plug member of the selector cock of the present invention is provided with a body portion having shape defined by a surface of revolution, it is impossible for the plug to cock out of position or engagement with each of the sealing rings associated with the several inlets and the outlets connected with the chamber in the valve casing. Thus, it will be readily apparent that the plug member of the valve unit is always sealed off, thereby preventing possible distortion of said plug member or leakage between the plug member and the casing. The plug member of the valve unit of the present invention is also provided with a passageway communicating with the outlet and one of the inlets, depending upon its position with respect to the casing.

The casing of the selector cock of the new invention is provided with a plurality of ports disposed substantially symmetrically therearound and in closely spaced relation. All of these ports may not, however, be used and some of them may merely be blind ports to enable the valve to be shut off completely in at least one of the positions of the plug member. The single passageway in the plug member is advantageously formed as an elbow and thereby prevents obstruction to the free flow of fluid therethrough affording a lesser pressure drop than is ordinarily experienced in the use of such units.

It is, therefore, an object of this invention to provide an improved fluid control valve.

It is another object of the present invention to provide a fluid control valve unit which embodies a casing having an internal chamber the wall of which accommodates and cooperates with a plug member having a shape defined by a surface of revolution in such manner that the plug may be tilted with respect to the chamber wall and yet effectively seal off the ports therein without affecting the operation of the valve unit.

Another object of the invention is to provide a valve unit in which the plug member is so constructed that it will cooperate to adjust its position with respect to the wall of the internal chamber of the casing to seat itself properly and seal the ports in the chamber against leakage.

A further object of the present invention is to provide a fluid control valve having a casing with mounting means associated with the inlet connections therefor, and a removable cover adapted to serve as a pilot or locating means for guiding the casing into position on the support on which it is mounted.

A still further object of the present invention is to provide a selector cock or fluid control valve having a substantially hemispherically shaped plug valve which prevents said plug from becoming cocked with respect to the casing.

It is a still further object of the present invention to provide a fluid control valve unit having a plug member which embodies a generally hemispherically shaped body portion and an integrally formed stem portion.

Another and still further object of the invention is to provide a plug member having a passageway extending therethrough which affords freedom of passage for the fluid being handled by the unit with a minimum pressure drop.

Another and still further object of the present invention is to provide a rotatable plug member which requires a relatively low sealing force for sealing off the inlet ports of the casing to prevent leakage at the ports.

Another and further object of the present invention is to provide a valve unit which is capable of being manufactured in quantities and at low cost to produce a structure having a high fidelity operation.

Other and still further objects of the invention will be apparent to those skilled in the art from the following detailed description of the annexed sheets of drawings which, by way of preferred example, illustrate one embodiment of the invention.

On the drawings:

Figure 1 is a top plan view of a selector cock which illustrates the principles of the present invention;

Figure 2 is a vertical cross-sectional view with parts in elevation and broken away taken along the line II—II of Figure 1;

Figure 3 is a bottom view of the valve structure of Figure 1;

Figure 4 is a plan view of the casing of the valve structure illustrated in Figure 1 with the cover member and the plug removed to show the arrangement of the ports therein;

Figure 5 is an elevation of the plug member for the valve unit of the present invention;

Figure 6 is a bottom view of the plug member illustrated in Figure 5 and showing the passageway extending therethrough; and Figure 7 is a fragmentary enlargement illustrating the method of mounting the stem portion of the plug member with respect to the cover member of the valve unit.

As shown on the drawings:

The valve structure of the present invention which will be referred to hereinafter as a selector cock and designated generally by the reference numeral 10 is adapted to be mounted upon a wall, floor or panel structure 11 in the manner illustrated in Figure 2. An aperture 12 is provided in the wall or other supporting structure and the valve unit 10 which comprises the casing 13 and the domed cover member 14 is secured thereto as by means of a plurality of screws 15 which are threaded into the casing 13 and so disposed that the cover member 14 extends through said opening 12.

The casing 13 is provided with a plurality of inlet connections 16 which are internally threaded for the reception of pipes, tubes or other like conduits for supplying fluid to the selector cock and extend radially with respect to the body of the casing 13. Each of the inlet connections 16 is provided with an upper plane surface 17 adapted to be mounted flush against one face of the wall 11 and into which a plurality of bolts 18 are threaded for the support of the cock 10 from the wall 11 after it has been located by the domed cover member 14 in the opening 12.

The casing 13 of the selector cock 10 is illustrated as being provided with a substantially hemispherically shaped chamber 20 although the chamber may assume other suitable forms. An outlet port 21, which, as in the case of the inlet connections 16, may be internally threaded or otherwise fitted for the reception of a suitable pipe, tube, conduit or the like, is formed in the base of chamber 20. The inlet connections 16 communicate with the chamber 20 of the casing 13 by means of the ports 22. One or more of the ports 22 depending upon the number of inlet connections to be provided may be a blind port, in this case, only one of said ports is not provided with an inlet connection.

Disposed in the chamber 20 and extending through a centrally disposed opening 24 in the domed cover member 14 is a unitary plug member 25 which embodies a hemispherical body portion 26 and an integrally formed stem portion 27 which is advantageously disposed centrally of the planar surface 28 of the body portion 26. The stem portion 27 which projects through the opening 24 in the domed cover member 14 is adapted to rotate the plug valve 25 and to selectively position the same to interconnect the outlet 21 with one of the ports 22 in the chamber 20 on the casing 13 as desired.

To prevent leakage between the plug 25 and the casing 13 each of the inlet ports 22 in the chamber 20 is provided with a suitable sealing member 29. The seals 29 may be formed of any suitable material such, for example, as neoprene, or other suitable rubber or plastic material, which is capable of withstanding deterioration or attack from the fluid being handled by the selector cock of the invention. Each seal 29 is advantageously of annular form and is adapted to be press fit or otherwise secured in a groove 30 so as to completely encircle each port 22.

It will be understood that the seals 29 can have a constant cross-sectional area of any shape by reason of the uniformly curved wall of the chamber 20 and the hemispherical configuration of the plug 25. Thus, the seals 29, although preferably of annular form, may be fabricated with a triangular, square or, in fact, any polygonal peripheral configuration, and may be easily and cheaply made.

Moreover, the seals 29 are adapted to lie in a plane normal to the radius of the plug 25. As a result the grooves 30 in which said seals are seated can be cut in the wall of the casing 13 with simple hollow end mill tools. This feature eliminates the necessity of special tools or difficult machining operations.

By virtue of the substantially equally spaced relation of the several seals 29 the plug 25 will be uniformly supported in the chamber 20 and will at all times by virtue of its hemispherical shape be in contact with said seals, thereby effectively preventing the possibility of leakage between the plug and the casing.

To provide a uniform pressure against the plug 25 so as to cause it to seat in its operation against the seals 29 there is provided a compression spring 32 which encircles the stem portion 27 of the plug 25. The spring 32 is held in place against the planar surface 28 of the valve member 25 as by means of the washer 33 having a depending flanged portion 34 to aid in centering it with respect to the spring 32 and the stem portion 27 of the plug 25. As will be seen from Figure 7 of the drawings, a suitable anti-friction bearing 35 is disposed between the washer 33 and a second washer 36, both of which form the ball races for the bearing 35. The washer 36 is urged by spring 32 against a suitable packing ring 37 disposed in an annular groove 38 in the underside of the cover member 14 and encircling the opening 24 therein through which the stem portion 27 of the plug 25 extends so as to prevent leakage of the fluid from the chamber 20 of the casing 13 about the stem portion 27.

The plug 25, by reason of its being urged against the several seals 29 by the spring 32 causes each of said seals to attempt to deform or spread out. The groove 30 in which each seal 29 is disposed serves to restrain this spreading action thereby compressing the seal. The plug 25 thus causes the seals 29 to seal the grooves 30 in compression and the body portion 26 of the plug 25 in tension. The seals 29, since they are in tension with respect to the face of the plug 25 afford an effective line contact seal with the lowest possible spring pressure on the plug 25. Inasmuch as the spring 32 may be less stiff and yet insure a positive sealing off of the plug 25, the torque resistance will be correspondingly lowered and the plug may be rotated with less force being applied to the stem portion 27.

A yoke member 40 is mounted on the end of the stem portion 27 projecting through the cover member 14 and is provided with a flanged portion 41 which contacts an anti-friction bearing 42 disposed about the stem portion 27 of the plug 25 and mounted externally of the cover member 14. A pin 43 extending through the stem portion 27 of the plug 25 perpendicular to the axis thereof engages a slot 44 in the yoke 40 and is supported at the base thereof by a cam surface 45. A plurality of position finders 47, one of which is located at each of the ports 22, embodying a domed shell 49 backed by a compression spring 50 disposed within a vertically extending bore 48 and engaging dimples (not shown) formed on the underside of the flanged portion 41 of the yoke 40 serve to indicate and retain the plug 25 in the selected position with respect to the port 22 as desired.

The plug 25 has formed therein a passageway 52 extending vertically from the center of the base thereof and thence laterally and interconnecting with the outside wall of the hemispherical body portion 26 so as to interconnect the outlet 21 with one of the inlet ports 22 in the casing 13 of the selector cock 10. The passageway 52 has the form of an elbow and is adapted to afford an unobstructed passage for the fluid from an inlet port 22 to the outlet 21 depending upon the position of the plug 25 with respect to the chamber 20 in the casing 13. By virtue of the construction of the passageway 52, no baffle or other obstruction is placed in the way of the fluid passing therethrough and, therefore, a minimum pressure drop is experienced as between the inlet and outlet ends thereof.

Whenever the pressure exerted by the fluid within the passageway 52 becomes greater, a condition which normally renders it more difficult to seal off the chamber 20 to prevent leakage therefrom about the stem 27 of the plug 25, the structure of the selector cock 10 is such that a more effective seal results. The fluid pressure against the curved wall of the passageway 52 in the body portion 26 of the plug 25 tends to raise the plug against the spring 32. As the spring 32 is compressed by the raising of the plug 25, the packing ring 37 is more tightly squeezed into the annular groove 38 in the cover 14. Since the groove 38 confines the ring 37, it will be caused to tightly engage the stem 27 at the point where it projects through the opening 24 in the cover 14, thereby increasing the effectiveness of the packing ring 37.

The single compression spring 32 advantageously serves not only to hold the plug 25 against the several seals 29 in the chamber 20, but also to seat the packing ring 37 in its groove 38.

In the operation of the selector cock 10, since the plug 25 is uniformly supported by the annular seals 29 disposed in the chamber 20 of the casing 13 and is urged against said seals by the spring 32 it is held tightly in place and may as a result form a pressure lock against the several seals. The anti-friction bearings 35 and 42 in which the stem portion 27 of the plug 25 is rotatably supported serve to aid in reducing the degree of torque required to shift the plug 25 when it is desired to interconnect the outlet 21 with a different one of the inlets 22.

Also aiding in freeing the plug 25, if it should become sealed in place during its use, is the cam surface 45 at the base of the slot 44 of the yoke 40. It will be seen that, as the yoke 40 is rotated, the pin 43 in the stem portion 27 of the plug 25 attempts to climb the inclined side of the cam surface 45, thus exerting a limited thrust in an axial direction upon the plug 25 and thereby relieving the pressure of the spring 32 against the plug 25 and each of the seals 29. The endwise movement of the plug 25 is only slight being limited by the provision of an annular rim 53 defining the outer perimeter of the planar surface 28 of the generally hemispherical body portion 26 of the plug 25 which is adapted to contact an annular shoulder 54 on the inner side of the cover member 14.

As will be understood from the foregoing description and a reference to the drawings, the plug 25 of the illustrated valve unit may be positioned in any one of five different locations with respect to the casing 13 of the selector cock 10. Thus, it will be seen, any one of the several inlets 22 including the one blind inlet may be interconnected at any time with the outlet 21 in the base of the casing 13 by the selective operation of the plug 25. The plug 25 will be retained in whatever position it is shifted by the registration of the position finders 47 with dimples formed in the underside of the flanged portion 41 of the yoke 40 against inadvertent or unauthorized shifting of the plug 25 from its selected position.

The selector cock 10 of the present invention is especially adapted for use in the handling of fuel from a plurality of tanks located in various parts of the fuselage, wings and other parts of an airplane to the airplane engine. The selector cock 10 may be employed to control the flow of fuel from any one of said tanks to the engines by connecting the outlet 21 with the proper inlet port 22 in chamber 20 or to completely shut off the flow of fuel from any of the tanks by positioning the plug 25 so that the passageway 52 extending therethrough interconnects the outlet 21 with the blind port 22 in the chamber 20.

While the several ports 22 in the chamber 20 associated with the several bosses or connections 16 of the casing 13 have been referred to as being inlets and the port 21 has been termed the outlet in the foregoing description, it will be understood that they may be readily interchangeable. Thus, instead of being employed to interconnect a plurality of supply sources with a single outlet, as in the present case, the selector cock 10 may serve equally advantageously to distribute a bulk supply from one source to a plurality of distributing points.

It will, of course, be understood that various details of construction may be varied through a wide range without departing from the principles of this invention. The body portion 26 of the plug member 25, while it is illustrated as being substantially hemisphercial in shape, may take the form of a spherical segment which is either smaller or larger than a hemisphere. The stem portion 27 of plug member 25 may be integral or not, as desired, and may extend in either or both directions through the axis of symmetry of the body portion 26. The passageway 52 in plug member 25 may traverse the body portion 26 angularly, as indicated, or it may extend straight through, branch or be duplicated. It is, therefore, not the purpose to limit the patent granted hereon otherwise than necessitated by the scope of the appended claim.

We claim as our invention:

In a selector cock, a casing provided with an internal chamber the wall of which defines a spherical segmental surface and having an inlet and an outlet, a rotary valve member having a substantially spherical segment body portion rotatable in said chamber and a stem portion, an annular cover member for said casing journaling said stem portion of the rotary valve member for rotative and axial movements, a sealing means disposed in said cover member and extending about the stem portion of the rotary valve member, an annular anti-friction thrust bearing surrounding said stem portion and abutting said sealing means, a spring surrounding said stem portion and operating between said body portion and said thrust bearing for positioning the rotary valve member in the casing and holding the sealing means in place against the cover member, and a passageway in the body portion of the rotary valve member to selectively interconnect the inlet and outlet in the casing, said passageway being so formed that the fluid admitted by the inlet exerts pressure against the wall of the passageway which tends to raise the rotary valve member, thereby further compressing the spring against said thrust bearing.

RUSSELL R. FIKE.
NATHAN W. OAKES.

REFERENCES CITED

The following references are of record in the file of this patent:

UNITED STATES PATENTS

| Number | Name | Date |
|---|---|---|
| 1,150,144 | Norton | Aug. 17, 1915 |
| 1,608,412 | Mechling | Nov. 23, 1926 |
| 2,127,679 | Dudley | Aug. 23, 1938 |
| 2,226,169 | Koehler | Dec. 24, 1940 |
| 2,233,840 | Koehler | Mar. 4, 1941 |
| 2,312,601 | Stillwagon | Mar. 2, 1943 |

FOREIGN PATENTS

| Number | Country | Date |
|---|---|---|
| 665,650 | Germany | Sept. 30, 1938 |